United States Patent
Kim et al.

(10) Patent No.: US 8,983,290 B2
(45) Date of Patent: Mar. 17, 2015

(54) SYSTEM AND METHOD FOR MONITORING A DUAL-POLARIZATION SIGNAL USING AN IN-BAND SUPERVISORY SIGNAL

(71) Applicant: Fujitsu Limited, Kawasaki-shi, Kanagawa (JP)

(72) Inventors: Inwoong Kim, Allen, TX (US); Olga Vassilieva, Plano, TX (US); Paparao Palacharla, Richardson, TX (US); Motoyoshi Sekiya, Richardson, TX (US); Jeng-Yuan Yang, Garland, TX (US)

(73) Assignee: Fujitsu Limited, Kawasaki-shi (JP)

( * ) Notice: Subject to any disclaimer, the term of this patent is extended or adjusted under 35 U.S.C. 154(b) by 78 days.

(21) Appl. No.: 13/925,279

(22) Filed: Jun. 24, 2013

(65) Prior Publication Data
US 2014/0376908 A1 Dec. 25, 2014

(51) Int. Cl.
H04B 10/077 (2013.01)
(52) U.S. Cl.
CPC ............................ *H04B 10/0775* (2013.01)
USPC ................................... 398/33; 398/26; 398/38
(58) Field of Classification Search
CPC .................................................. H04B 10/0775
USPC .............................. 398/26, 30–33, 38
See application file for complete search history.

(56) References Cited

U.S. PATENT DOCUMENTS

| 8,761,600 B2 * | 6/2014 | Kim et al. ................... 398/30 |
| 2014/0010543 A1 * | 1/2014 | Lee ................................ 398/79 |

* cited by examiner

*Primary Examiner* — Leslie Pascal
(74) *Attorney, Agent, or Firm* — Baker Botts L.L.P.

(57) ABSTRACT

Systems and method for monitoring an optical power of a dual-polarization signal are disclosed. The systems and methods may include measuring a first parameter set associated with a supervisory signal, the supervisory signal being communicated in-band with the dual-polarization signal; calculating a second parameter set from the first parameter set; calculating an intensity value from the second parameter set, the intensity value associated with one of the polarization states of the dual-polarization signal; and estimating a signal power associated with the supervisory signal from the intensity value.

24 Claims, 3 Drawing Sheets

SYSTEM AND METHOD FOR MONITORING A DUAL-POLARIZATION SIGNAL USING AN IN-BAND SUPERVISORY SIGNAL

TECHNICAL FIELD

This invention relates generally to the field of optical networks and more specifically to monitoring a dual-polarization signal using an in-band supervisory signal.

BACKGROUND

As the importance and ubiquity of optical communication systems increases, it becomes increasingly important to be able to accurately and efficiently monitor the optical communication system in order to ensure proper operation of the optical communication system. The importance of accurate and efficient monitoring increases as optical traffic signals are implemented comprising components with multiple polarizations (e.g., dual-polarization signals). It is increasingly important to be able to monitor the optical communication system in a cost-effective manner, as well as monitor in-line with other components of the optical communication system.

SUMMARY OF THE DISCLOSURE

In accordance with certain embodiments of the present disclosure, systems and method for monitoring an optical power of a dual-polarization signal are disclosed. The systems and methods may include measuring a first parameter set associated with a supervisory signal, the supervisory signal being communicated in-band with the dual-polarization signal; calculating a second parameter set from the first parameter set; calculating an intensity value from the second parameter set, the intensity value associated with one of the polarization states of the dual-polarization signal; and estimating a signal power and signal-to-noise ratio associated with the supervisory signal from the intensity value.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

As used herein, the term "computer-readable media" may be any available media that may be accessed by a general purpose or special purpose computer. By way of example, and not limitation, such computer-readable media may comprise tangible computer-readable including RAM, ROM, EEPROM, CD-ROM or other optical disk storage, magnetic disk storage or other magnetic storage devices, or any other medium which may be used to carry or store desired program code means in the form of computer-executable instructions or data structures and which may be accessed by a general purpose or special purpose computer. Combinations of the above should also be included within the scope of computer-readable media.

Additionally, "computer-executable instructions" may include, for example, instructions and data which cause a general purpose computer, special purpose computer, or special purpose processing device to perform a certain function or group of functions.

As used herein, the term "module" or "component" may refer to software objects or routines that execute on a computing system. The different components, modules, engines, and services described herein may be implemented as objects or processes that execute on the computing system (e.g., as separate threads), as well as being implemented as hardware, firmware, and/or some combination of all three.

The following describes a cost-effective, in-line solution for monitoring an optical traffic signal of an optical communication system. The present disclosure describes systems and methods for monitoring a relatively low-data rate supervisory signal within existing components of the wireless communication system in order to determine changes in the signal-to-noise ratio ("SNR") and/or optical power of the optical traffic signal.

Figure 1:
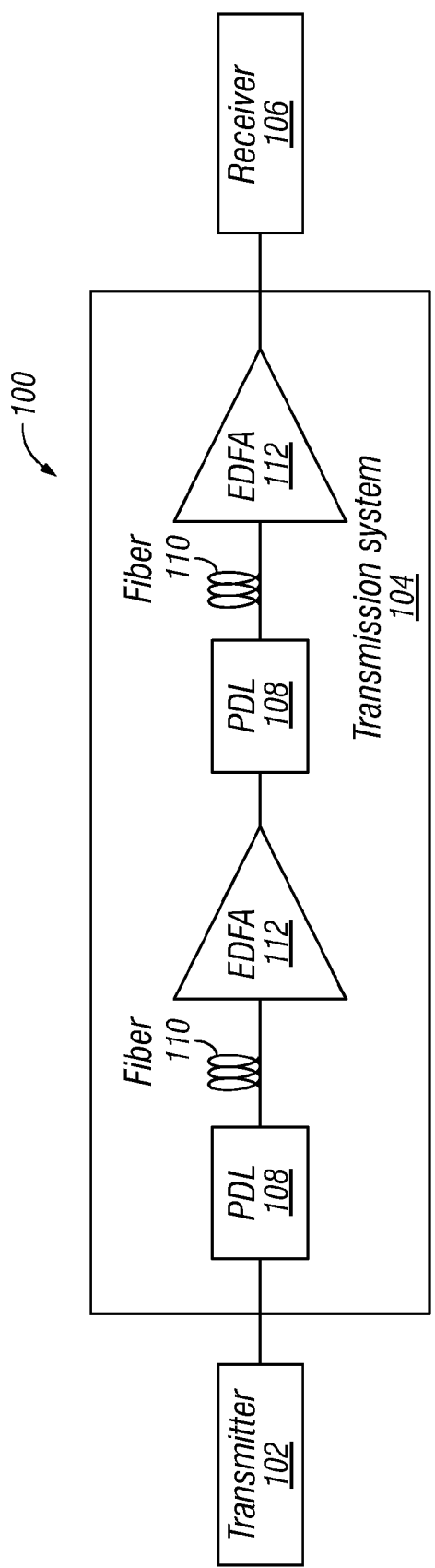
FIG. 1 illustrates an example model optical system for describing the behavior of an optical transmission system, in accordance with certain embodiments of the present disclosure.

FIG. 1 illustrates an example model optical system 100 for describing the behavior of an optical transmission system, in accordance with certain embodiments of the present disclosure. System 100 may include transmitter 102, transmission system 104, and receiver 106. The example system 100 of FIG. 1 illustrates a simplified point-to-point optical system. Although one particular form or topography of system 100 is illustrated, system 100 may take any appropriate form, including a ring network, mesh network, and/or any other suitable optical network and/or combination of optical networks.

In some embodiments, transmitter 102 may be any electronic device, component, and/or combination of devices and/or components configured to transmit a multi-polarization optical signal to receiver 106. For example, transmitter 102 may include one or more lasers, processors, memories, digital-to-analog converters, analog-to-digital converters, digital signal processors, beam splitters, beam combiners, multiplexers, and/or any other components, devices, and/or systems required to transmit a dual-polarization optical signal to receiver 106.

In some embodiments, transmitter 102 may be further configured to include a supervisory signal in-band with the optical traffic signal. The systems and methods describing one particular implementation of the supervisory signal with a dual-polarization optical signal are described in more detail in U.S. patent application Ser. Nos. 13/620,102, and 13/620,172, both of which are hereby incorporated by reference. For the purposes of this disclosure, references to an "optical signal" and/or an "optical traffic signal" should be assumed to include the in-band supervisory signal unless expressly stated otherwise.

In some configurations of system 100, it may be costly to implement an in-band supervisory signal with a dual-polarization optical signal. For example, it may be necessary to install high-speed (and thus expensive) photo-detectors, processors, and/or polarimeters. However, in other configurations of system 100, a low-data rate supervisory signal may be implemented, allowing for the use of low-speed (and thus lower-cost) photo-detectors, processors, and/or polarimeters. In some embodiments, a low-data rate supervisory signal may have a modulation period much longer than the data period of the optical traffic signal. In the same or alternative embodiments, the low-data rate supervisory signal may allow the supervisory signal to be more easily separated from a main data signal.

In some embodiments, transmitter 102 may communicate an optical traffic signal (along with the in-band supervisory signal) to receiver 106 via transmission system 104. Transmission system 104 may be generally modeled through the following components: one or more polarization dependent loss 108, one or more fiber 110, and/or one or more amplifier 112. With reference to FIG. 1, these components are provided to aid in illustration and are not intended to limit the scope of the present disclosure. In some configurations of system 100, system 100 may be modeled by more, fewer, and/or different components than those illustrated in FIG. 1.

Polarization dependent loss 108 may be configured to model the polarization dependent loss of transmission system 104. The phenomenon of polarization dependent loss is one common to the transmission of dual-polarization optical signals and is well known to one of ordinary skill in the art.

In addition, transmission system 104 may also be modeled through the use of fiber 110. In some embodiments, fiber 110 may be used to model certain parameters that may be characteristic of a particular type of optical fiber used in a given configuration of system 100. For example, fiber 110 may include fiber-specific properties such as length, bandwidth, etc. Further, transmission system 104 may also include amplifier 112. In some embodiments, amplifier 112 may be any amplifier configured to amplify the optical traffic signal (along with the in-band supervisory signal) for more efficient transmission to receiver 106. For example, amplifier 112 may be an erbium doped fiber amplifier ("EDFA") common to optical communication systems. In some embodiments, amplifier 112 may be responsible for certain types of noise introduced to the optical traffic signal. For example, an EDFA introduces a type of noise known to one of ordinary skill in the art as amplified spontaneous emission ("ASE").

In some embodiments, receiver 106 may be any electronic device, component, and/or combination of devices and/or components configured to receive a multi-polarization optical signal from transmitter 102. For example, transmitter 102 may include one or more lasers, optical modulators, processors, memories, digital-to-analog converters, analog-to-digital converters, digital signal processors, beam splitters, beam combiners, demultiplexers, and/or any other components, devices, and/or systems required to receive a dual-polarization optical signal from transmitter 102.

In some embodiments, transmitter 102 and receiver 106 may be present in the same device, for example in an optical communication network including a plurality of optical nodes that are interconnected. In the same or alternative embodiments, transmitter 102 and receiver 106 may be separate devices, located either locally or remote from one another.

In operation, transmitter 102 may communicate a dual-polarization optical traffic signal (along with the in-band supervisory signal) to receiver 106 via transmission system 104. In some embodiments, transmitter 102 may communicate the dual-polarization optical traffic signal via an appropriate modulation scheme. For example, transmitter 102 may communicate the dual-polarization optical traffic signal to receiver 104 via a phase shifting modulation technique (e.g., dual-polarization quadrature phase-shift keying ("DP-QPSK")). In some embodiments, the modulation scheme used to transmit the data portion of the dual-polarization optical traffic signal may be different from the modulation scheme used to transmit the supervisory signal. For example, transmitter 102 may communicate the supervisory signal using amplitude shift keying, on-off keying, and/or any appropriate modulation scheme. In the same or alternative embodiments, the supervisory signal may be communicated using a frequency shift keying modulation scheme. In such embodiments, it may be necessary or desirable to include a frequency discriminator as part of receiver 106.

At transmitter 102, the optical signal-to-noise ratio ("OSNR") of the X- and Y-components of the optical traffic signal may be substantially the same. Likewise, the signal power of the two components may be substantially the same. However, at receiver 106, the OSNR and/or signal power of the components of the optical traffic signal may be different due to the effects of PDL 108 and/or amplified spontaneous emission noise from EDFA 112.

By monitoring the supervisory signal communicated in-band with the optical traffic signal, system 100 may be able to determine the effects of this OSNR and/or signal power distortion. Because there is a substantially identical relationship between the signal-to-noise ratio ("SNR") and power of the supervisory signal on the one hand and the OSNR and power of the optical traffic signal on the other hand, by monitoring the lower-power, lower-speed supervisory signal, system 100 may be able to more efficiently monitor distortive effects on the optical traffic signal.

Figure 2:
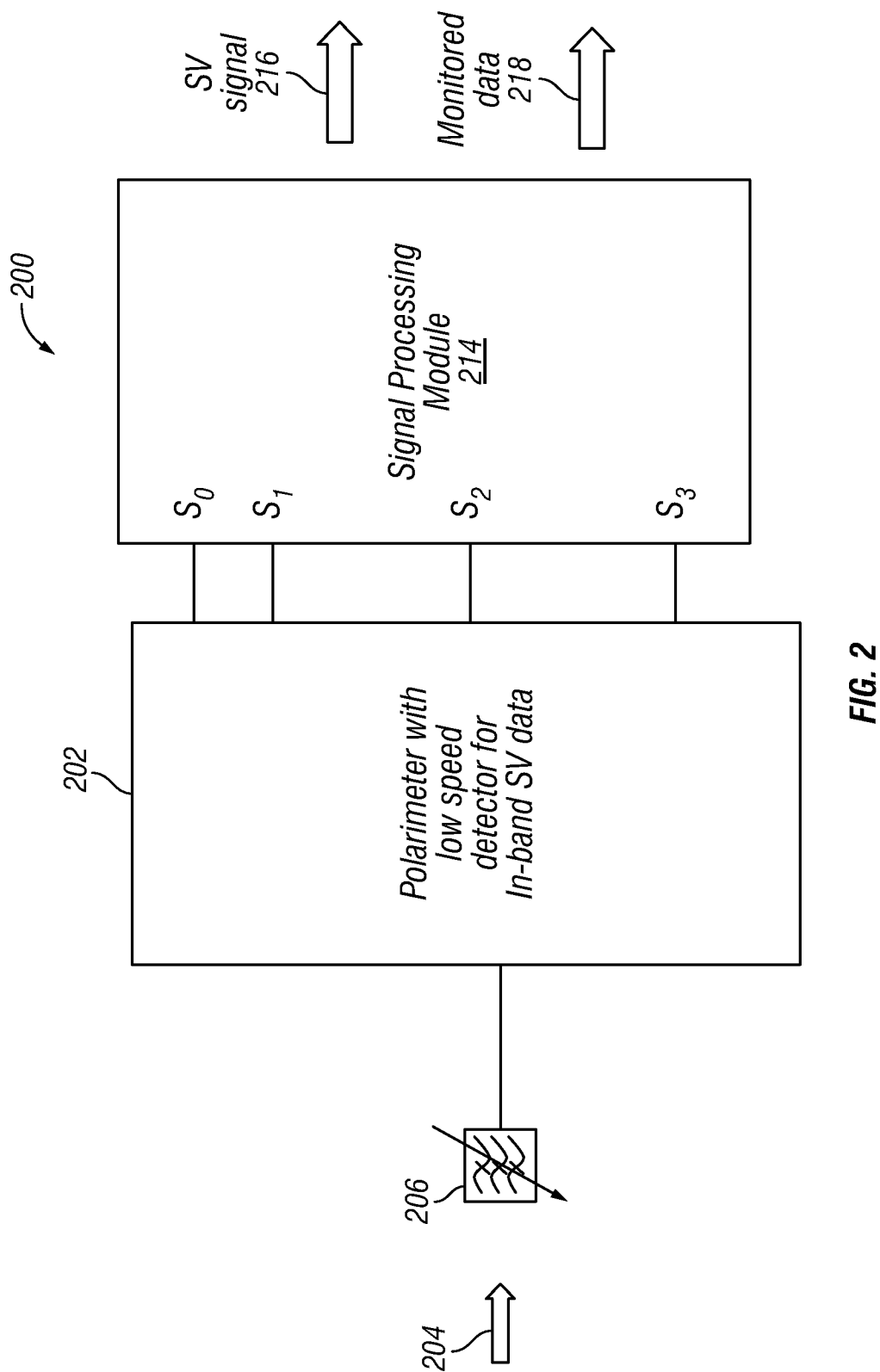
FIG. 2 illustrates an example supervisory signal polarimeter for monitoring the signal-to-noise ratio and/or power of a supervisory signal, in accordance with certain embodiments of the present disclosure.

FIG. 2 illustrates an example supervisory signal system 200 for monitoring the SNR and/or power of a supervisory signal, in accordance with certain embodiments of the present disclosure. In some embodiments, system 200 may include one or more tunable optical filter(s) 206, one or more polarimeter(s) 202, and/or one or more signal processing module(s) 214. Although a certain number of each component of system 200 are depicted in FIG. 2, system 200 may include more, fewer, and/or different numbers of components. Further, although one set of components of system 200 is illustrated in FIG. 2, one or more set(s) of components, which may differ in configuration, may be included within a given configuration of system 200 without departing from the scope of the present disclosure.

In some embodiments, system 200 may be configured to output data to one or more other component(s) of traffic system 100. For example, system 200 may be configured to output supervisory signal data 216 and/or monitored signal data 218. As described in more detail below and with reference to FIGS. 1 and 3, monitored signal data 218 may be data associated with the OSNR and/or power of the main data associated with the optical communication channel, which may be estimated from the SNR and signal power of supervisory signal data in signal processing module 214.

In some embodiments, monitored signal data 218 may include data associated with the main data signal, as described in more detail below with reference to FIG. 3. For example, monitored signal data 218 may include an estimated OSNR of the polarization components of the main data signal, and/or estimated optical signal power components of the polarization components of the main data signal. In the same or alternative embodiments, monitored signal data 218 may also include calibration data that may connect a measured SNR of the supervisory data signal to the OSNR of the main data signal. The calibration data may also include data that may connect measured optical and/or electrical signal power of the supervisory data to the optical power of the main data signal. For example, traffic system 100 may be configured such that the calibration data may be set in a factory or other pre-installation environment for a given modulation format of supervisory and main data signals.

In some embodiments, optical traffic signal 204 may be communicated to system 200. For example, the optical traffic signal incident from transmitter 102 of system 100 may be tapped and directed to polarimeter 202 of system 200. In some embodiments, the supervisory signal being communicated from transmitter 102 may be modulated using an appropriate modulating scheme. For example, the supervisory signal may be modulated using an amplitude shift keying scheme. In such embodiments, optical traffic signal 204 may then be communicated to tunable optical filter 206. In some embodiments, tunable optical filter 206 may be any device, components, system, and/or any combination thereof configured to select a wavelength channel of optical traffic signal 204 for monitoring. In some configurations, tunable optical filter 206 may be controlled manually, electronically, programmatically, automatically, and/or any combination thereof. Once tunable optical filter 206 has selected a wavelength channel for monitoring, the wavelength channel may then be communicated to one or more polarization controllers 208.

In the same or alternative embodiments, tunable optical filter 206 may be supplemented and/or replaced by a tunable frequency discriminator. For example, in configurations of system 100 in which the supervisory signal is communicated via frequency-shift keying, system 200 may use a tunable frequency discriminator to select a wavelength channel to be monitored. The tunable frequency discriminator may further be configured to convert the carrier frequency modulation to intensity modulation.

In some embodiments, polarimeter 202 may also include one or more low-pass filter(s) 212. These low-pass filter(s) may be any device, component, system, and/or any combination thereof configured to filter the supervisory signal from the component of the monitored wavelength channel. As described in more detail above and with reference to FIGS. 1 and 3, the supervisory signal may be low-power and/or low data rate (as compared to the optical traffic channel). The low-pass filter(s) may be configured to allow the supervisory signal through for further analysis.

In some embodiments, system 200 may also include one or more signal processing module(s) 214. Signal processing module 214 may be any device, component, system, and/or any combination thereof configured to analyze components of the supervisory signal. Further, signal processing module 214 may include memory having program instructions stored thereon for execution, wherein the program instructions carry out the analysis of the supervisory signal components. These instructions may be incorporated into one or more programs, modules, classes, and/or other data structures configured to perform the analysis of the supervisory signal components. Depending on the configuration of system 200 and/or system 100, these instructions may be located locally, remotely, and/or some combination thereof. Further, the instructions may be stored and/or executed by one or more signal processing module(s) 214 without departing from the scope of the present disclosure.

As described in more detail below and with reference to FIGS. 1 and 3, signal processing module 214 may be configured to analyze components of the supervisory signal in order to measure the SNR and/or signal power of the received supervisory signal. In some embodiments, signal processing module 214 performs this analysis by determining one or more parameter set(s) associated with the supervisory signal components. For example, signal processing module 214 may first determine a "Stokes vector" for the supervisory signal.

A Stokes vector may generally be described as one of a class of parameter sets describing an optical signal. Specifically, a Stokes vector may include information associated with the state of polarization of the various components of the supervisory signal. The Stokes vector may include the Stokes parameters, which may describe the polarization state of a given supervisory signal. For example, when measuring the current state of a supervisory signal with the coordinates of system 200, the measured Stokes vector ("$S_m$") may be expressed as:

$$S_m = \begin{bmatrix} S_{m,0} \\ S_{m,1} \\ S_{m,2} \\ S_{m,3} \end{bmatrix}$$

In some embodiments, system 200 may also determine a second parameter set for use in analyzing the components of the supervisory signal. For example, signal processing module 214 may also determine an "output" Stokes vector ("$S_o$") for the supervisory signal with the coordinate system of transmitter 102. This vector may be calculated from the measured Stokes vector $S_m$, as described in more detail below. In some embodiments, the output Stokes vector may be expressed as:

$$S_o = \begin{bmatrix} S_{o,0} \\ S_{o,1} \\ S_{o,2} \\ S_{o,3} \end{bmatrix}$$

In the case of a dual-polarization optical signal, the output Stokes vector may be calculated as described below with reference to FORMULA 1. With reference to FORMULA 1, the intensity ("I") of a particular component is referenced by superscript describing the component's polarization state. The intensity values of a particular component may be determined with reference to FORMULAS 2-3.

$$[S_{o,0}(t), S_{o,1}(t), S_{o,2}(t), S_{o,3}(t)] = [I_x + I_y, I_x - I_y, I_{45} - I_{-45}, I_{right\ circ} - I_{left\ circ}] \quad \text{FORMULA 1}$$

$$I_x(t) = \alpha(1 + md_s(t))I_s + h_{ns,x}(t) = E_x E_x \quad \text{FORMULA 2}$$

$$I_y(t) = +\beta(1 + m\bar{d}_s(t))I_s + h_{ns,y}(t) = \beta(1 - md_s(t))I_s + = E_y E_y^* \quad \text{FORMULA 3}$$

With reference to FORMULAS 2-3, m may be used to represent a modulation depth associated with the supervisory signal. In some embodiments, m may be much less than one. Additionally, $d_s(t)$ may be used to represent the supervisory data. In some embodiments, this value may be either −1 or 1. In the same or alternative embodiments, $\bar{d}_s(t)$ may be used to represent a value opposite that represented by $d_s(t)$. Further, $h_{ns,y}(t)$ may be used to represent a noise power associated with a component of the supervisory signal. $I_S$ may be used to represent a constant signal power. Finally, $\alpha$ and $\beta$ may be coefficients chosen to reflect signal losses. In some embodiments, they may be different due to, for example, polarization dependent loss.

In a dual-polarization example, components that may be polarized either in +/−45° and/or left/right circular may only represent noise components. As a result, the first Stokes parameter of the output Stokes vector may be determined with reference to FORMULA 4.

$$S_{o,1} = I_x - I_y = \alpha(1 + md_s(t))I_s(t) - \beta(1 - md_s(t))I_s(t) + h_{bsmx}(t) - h_{ns,x} - h_{nx,y}(t) = (\alpha + \beta)md_s(t)I_s + (\alpha - \beta)I_s + h_{ns,x}(t) - h_{ns,y}(t) \quad \text{FORMULA 4}$$

With reference to FORMULA 4, the term "$(\alpha+\beta)md_s(t)I_s$" may represent the supervisory signal.

In some embodiments, the output Stokes vector $S_o$ may be estimated from the measured Stokes vector $S_m$ by:

$$S_o \approx S_e = \begin{bmatrix} S_{e,0} \\ S_{e,1} \\ S_{e,2} \\ S_{e,3} \end{bmatrix} = M^{-1} S_m$$

In the above example, "$M^{-1}$" may be the inverse Mueller matrix describing polarization rotation in transmission system 100. $S_e$ may be referred to as an "estimated" Stokes vector, and may be calculated from an inverse Mueller matrix as described in more detail above. In some embodiments, $S_e$ may then be approximated as $S_o$. In some embodiments, system 200 may be further configured to adjust the elements of the Mueller matrix in order to maximize the radio frequency ("RF") power of $S_{e,1}$ may be maximized, as described in more detail below with reference to FIG. 3. In the same or alternative embodiments, the RF power of $S_{e,2}$ and/or $S_{e,3}$ may be minimized to find $M^{-1}$. Using the estimated Stokes vector, system 200 may be further configured to estimate intensity components of the supervisory signal. For example, in a dual-polarization system, the X- and Y-component intensities may be determined with reference to FORMULAS 5-6. With reference to FORMULAS 5-6, n may be used to represent an index for the sampled signal.

$$I_{x,n} = 0.5(S_{o,0}(t_n) + S_{o,1}(t_n)) \quad \text{FORMULA 5}$$

$$I_{y,n} = 0.5(S_{o,0}(t_n) - S_{o,0}(t_n)) \quad \text{FORMULA 6}$$

In some embodiments, once these estimated values are determined, SNR and signal power of the supervisory signal components may be determined. For example, SNR and electrical signal power may be determined with reference to FORMULAS 7-10 below. With reference to FORMULAS 7-10, "n1" may be used to represent an index of sampled supervisory signal data (or $\overline{\text{data}}$) corresponding to '1' for the given component, while "n0" may be used to represent an index of sampled supervisory signal data (or $\overline{\text{data}}$) corresponding to '0' for the given component.

$$SNR_x \approx [(<I_{x,n1}> - <I_{x,n0}>)/(\delta I_{x,n1} + \delta I_{x,n0})]^2 \quad \text{FORMULA 7}$$

$$SNR_y \approx [(<I_{y,n1}> - <I_{y,n0}>)/(\delta I_{y,n1} + \delta I_{y,n0})]^2 \quad \text{FORMULA 8}$$

Signal power of X-pol. SV signal $\propto \Delta I_x^2 = (<I_{x,n1}> - <I_{x,n0}>)^2 \quad \text{FORMULA 9}$ Signal power of Y-pol. SV signal $\propto \Delta I_y^2 = (<I_{y,n1}> - <I_{y,n0}>)^2 \quad \text{FORMULA 10}$ As described above, FORMULAS 9-10 may be used to denote the RF power described therein. As described in the example formulas above, the optical power of a supervisory signal of two orthogonal polarization components may be proportional to the square root of the results of FORMULAS 9-10.

In some embodiments, there may be a one-to-one relation between calculated SNR (or signal power) of in-band supervisory signal and the OSNR (or signal power) of data signal in each polarization component. Thus, the OSNR (or signal power) of a dual-polarization signal in each polarization component may be estimated.

As described in more detail below with reference to FIG. 3, the estimated component intensities may be further used to determine one or more weighting factors. In some embodiments, these weighting factors may be used to adjust the value of the supervisory signal in order to improve performance. For example, the supervisory signal may be represented as: SV signal=$w_x I_{x,n} - w_y I_{y,n}$. In some embodiments, the weighting factors "$w_x$" and "$w_y$" may be determined by reference to FORMULAS 11-12. With reference to FORMULAS 11-12, "k" may be used to denote a number that may improve SNR, as described in more detail below with reference to FIG. 3. For example, k may be a natural number.

$$w_x = \frac{[SNR_x / \Delta I_x]^k}{[SNR_x / \Delta I_x]^k + [SNR_y / \Delta I_y]^k} \quad \text{FORMULA 11}$$

$$w_y = \frac{[SNR_y / \Delta I_y]^k}{[SNR_x / \Delta I_x]^k + [SNR_y / \Delta I_y]^k} \quad \text{FORMULA 12}$$

system 200 may select a wavelength bandwidth of an incoming optical traffic signal, divide the wavelength bandwidth into a plurality of components, filter out the supervisory signal, and then analyze the supervisory signal. System 200 may utilize two parameter sets in order to determine changes in SNR and/or optical power in the supervisory signal. As one example, system 200 may determine a measured Stokes vector and an estimated Stokes vector. From these parameter sets, system 200 may determine an intensity value associated with one or more components of the supervisory signal. With these intensity values, system 200 may further determine the SNR and/or signal power associated with the components of the supervisory signal, and as a result additional weighting factors that may be used in adjusting the supervisory signal. For example, system 200 may be configured to estimate the SNR and/or signal power associated with the supervisory signal of each orthogonal polarization component from the measured Stokes vector.

Figure 3:
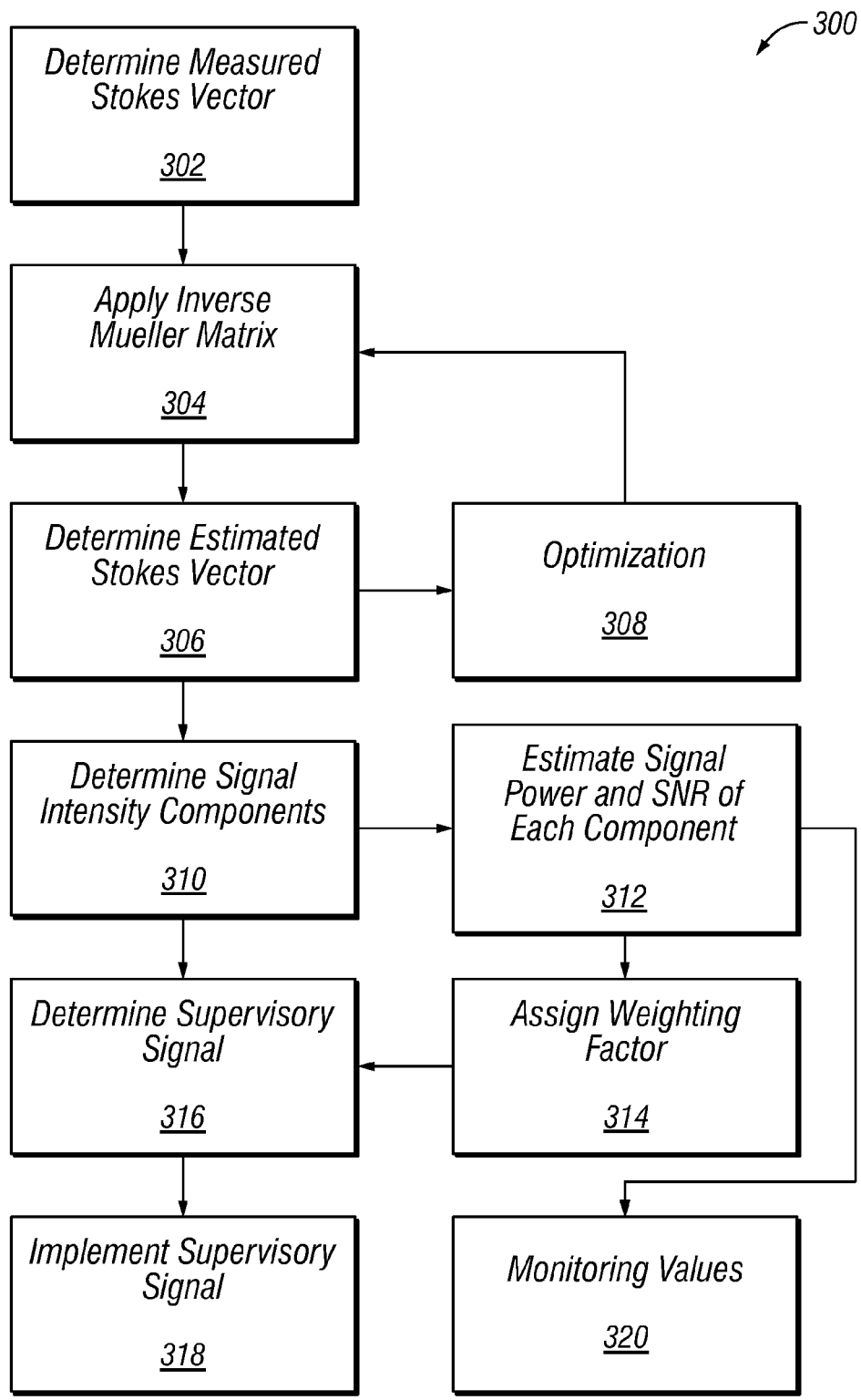
FIG. 3 illustrates a flowchart of an example method for monitoring a supervisory signal associated with an optical traffic signal, in accordance with certain embodiments of the present disclosure.

FIG. 3 illustrates a flowchart of an example method 300 for monitoring a supervisory signal associated with an optical traffic signal, in accordance with certain embodiments of the present disclosure. Method 300 may include determining a first parameter set, determining a second parameter set, and determining an intensity value associated with a component of the supervisory signal.

According to one embodiment, method 300 may begin at 302. Teachings of the present disclosure may be implemented in a variety of configurations. As such, the preferred initialization point for method 300 and the order of 302-318 comprising method 300 may depend on the implementation chosen.

At 302, method 300 may determine a first parameter set associated with one or more components of the supervisory signal, as described in more detail above with reference to FIGS. 1-2. For example, method 300 may determine a measured Stokes vector associated with the components of the supervisory signal. After determining the parameter set, method 300 may proceed to 304. In some embodiments, measurements associated with 302 may occur in real-time and/or near-real-time. As a result, in some embodiments, method 300 may return to the beginning of 302 after determining a first parameter set. Using a first set of measurements, method 300 may proceed to 304 to perform some or all of the remaining method while making additional measurements simultaneously.

At 304, method 300 may analyze the parameter set, as described in more detail above with reference to FIGS. 1-2. For example, method 300 may apply an inverse Mueller matrix to the measured Stokes vector. After analyzing the parameter set, method 300 may proceed to 306. At step 306, method 300 may determine a second parameter set associated with one or more components of the supervisory signal, as described in more detail above with reference to FIGS. 1-2. For example, method 300 may estimate a Stokes vector associated with the components of the supervisory signal at a coordinate system associated with transmitter 102. After determining the second parameter set, method 300 may proceed to 308.

At 308, method 300 may perform an optimization routine to optimize the second parameter set, as described in more detail above with reference to FIGS. 1-2. In some embodiments, method 300 may maximize or minimize certain parameters of the second parameter set. For example, method 300 may maximize the RF power of $S_{e,1}$ of the estimated Stokes vector in order to determine an optimized Mueller matrix. With the optimized values, method 300 may return to step 304, wherein the analysis may incorporate updated parameter values.

In some embodiments, method 300 may also proceed from 306 to 310. At 310, method 300 may determine one or more intensity values associated with the components of the supervisory signal, as described in more detail above with reference to FIGS. 1-2. After determining the intensity values, method 300 may proceed to step 312.

At step 312, method 300 may estimate the SNR and/or optical power associated with the components of the supervisory signal, as described in more detail above with reference to FIGS. 1-2. After estimating the SNR and/or optical power values, method 300 may proceed to 314. In some embodiments, method 300 may also proceed to step 320 from step 312.

At 320, method 300 may communicate a plurality of monitoring values, as described in more detail above with reference to FIGS. 1-2. For example, method 300 may communicate data associated with the power and/or OSNR of the main data portion of the optical communication channel. After communicating this data, method 300 may return to step 302.

At step 314, method 300 may assign one or more weighting factors associated with the intensity values, as described in more detail above with reference to FIGS. 1-2. In some embodiments, method 300 may determine one or more weighting factors in order to optimize SNR in a single input, multiple output environment. In the same or alternative embodiments, weighting factors may be determined in order to reduce total SNR. After assigning the weighting factors, method 300 may proceed to 316.

At 316, method 300 may use information from 310 and 314 to determine values associated with the supervisory signal, as described in more detail above with reference to FIGS. 1-2. For example, the supervisory signal may be given values in accordance with the characterization SV signal=$w_x I_{x,n} - w_y I_y$, n, as described in more detail above with reference to FIG. 2. After determining the supervisory signal, method 300 may proceed to 318.

At step 318, method 300 may implement the supervisory signal, as described in more detail above with reference to FIGS. 1-2. For example, one or more components of system 100 (e.g., transmitter 102) may implement the supervisory signal in order to communicate it along with the optical traffic signal via transmission system 104.

Although FIG. 3 discloses a particular number of steps to be taken with respect to method 300, method 300 may be executed with more or fewer than those depicted in FIG. 3. For example, in some configurations of system 100, the feedback loop from 308 to 304 may be unnecessary and/or undesirable.

What is claimed:

1. A method for monitoring an optical power of a dual-polarization signal, the method comprising:
    measuring a first parameter set associated with a supervisory signal, the supervisory signal being communicated in-band with the dual-polarization signal;
    calculating a second parameter set from the first parameter set;
    calculating an intensity value from the second parameter set, the intensity value associated with one of the polarization states of the dual-polarization signal; and
    estimating a signal power associated with the supervisory signal from the intensity value.

2. The method of claim 1, further comprising estimating a signal-to-noise ratio associated with the supervisory signal from the intensity value.

3. The method of claim 2, wherein estimating the signal-to-noise ratio associated with the supervisory signal comprises estimating the signal-to-noise ratio for each orthogonal polarization component of the supervisory signal.

4. The method of claim 2, further comprising estimating a signal power and an optical signal-to-noise ratio associated with the dual-polarization signal at least from the signal power and the signal-to-noise ratio associated with the supervisory signal.

5. The method of claim 4, wherein estimating the signal power and the optical signal-to-noise ratio associated with the dual-polarization signal comprises estimating the signal power and the optical signal-to-noise ratio associated with the x-polarization state of the dual-polarization signal.

6. The method of claim 4, wherein estimating the signal power and the optical signal-to-noise ratio associated with the dual-polarization signal comprises estimating the signal power and the optical signal-to-noise ratio associated with the y-polarization state of the dual-polarization signal.

7. The method of claim 1, further comprising determining a weighting factor associated with the intensity value.

8. The method of claim 7, further comprising applying the weighting factor to adjust the supervisory signal.

9. The method of claim 1, further comprising optimizing a radio frequency power associated with the second parameter set.

10. The method of claim 1, wherein the first parameter set is a Stokes vector.

11. The method of claim 1, wherein calculating the second parameter set comprises applying an inverse Mueller matrix to the first parameter set.

12. The method of claim 1, wherein the second parameter set is a Stokes vector.

13. A signal modulator for monitoring an optical power of a dual-polarization signal, the modulator comprising:
    a plurality of polarization components configured to detect a plurality of components of a dual-polarization optical signal; and
    a signal processing module configured to:
        determine a first parameter set from the plurality of components, the first parameter set associated with a supervisory signal, the supervisory signal being communicated in-band with the dual-polarization signal;
        calculate a second parameter set from the first parameter set;

calculate an intensity value from the second parameter set, the intensity value associated with one of the plurality of components; and estimate a signal power associated with the supervisory signal from the intensity value.

14. The signal modulator of claim 13 wherein the signal processing module is further configured to estimate a signal-to-noise ratio associated with the supervisory signal from the intensity value.

15. The signal modulator of claim 14, wherein the signal processing module is further configured to estimate the signal-to-noise ratio associated with the supervisory signal by estimating the signal-to-noise ratio for each orthogonal polarization component of the supervisory signal.

16. The signal modulator of claim 14, wherein the signal processing module is further configured to estimate a signal power and a signal-to-noise ratio associated with the dual-polarization signal at least from the signal power and the signal-to-noise ratio associated with the supervisory signal.

17. The signal modulator of claim 16, wherein the signal processing module is configured to estimate the signal power and the optical signal-to-noise ratio associated with the dual-polarization signal by estimating the signal power and the optical signal-to-noise ratio associated with the x-polarization state of the dual-polarization signal.

18. The signal modulator of claim 16, wherein the signal processing module is configured to estimate the signal power and the optical signal-to-noise ratio associated with the dual-polarization signal by estimating the signal power and the optical signal-to-noise ratio associated with the y-polarization state of the dual-polarization signal.

19. The signal modulator of claim 13, wherein the signal processing module is further configured to determine a weighting factor associated with the intensity value.

20. The signal modulator of claim 19, wherein the signal processing module is further configured to apply the weighting factor to adjust the supervisory signal.

21. The signal modulator of claim 13, wherein the signal processing module is further configured to optimize a radio frequency power associated with the second parameter set.

22. The signal modulator of claim 13, wherein the first parameter set is a Stokes vector.

23. The signal modulator of claim 13, wherein the signal processing module is configured to calculate the second parameter set by applying an inverse Mueller matrix to the first parameter set.

24. The signal modulator of claim 13, wherein the second parameter set is a Stokes vector.

* * * * *